US012468139B2

(12) United States Patent
Payne et al.

(10) Patent No.: US 12,468,139 B2
(45) **Date of Patent: *Nov. 11, 2025**

(54) WEAPON SIGHT PACKAGING

(71) Applicant: Crimson Trace Corporation, Columbia, MO (US)

(72) Inventors: Trevor Payne, Columbia, MO (US); William A. Planck, Columbia, MO (US); Tim Meissen, Columbia, MO (US); Michael Cottrell, Ashland, MO (US); James Tayon, Moberly, MO (US); Ryan Donahue, Columbia, MO (US); John Oller, Columbia, MO (US); Curtis Smith, Columbia, MO (US)

(73) Assignee: Crimson Trace Corporation, Columbia, MO (US)

(*) Notice: Subject to any disclaimer, the term of this patent is extended or adjusted under 35 U.S.C. 154(b) by 0 days.

This patent is subject to a terminal disclaimer.

(21) Appl. No.: 18/053,340

(22) Filed: Nov. 7, 2022

(65) Prior Publication Data

US 2023/0144006 A1 May 11, 2023

Related U.S. Application Data

(60) Provisional application No. 63/263,685, filed on Nov. 7, 2021.

(51) Int. Cl.

| | |
|---|---|
| ***B65D 25/10*** | (2006.01) |
| ***B65D 6/08*** | (2006.01) |
| ***B65D 25/54*** | (2006.01) |
| ***B65D 77/26*** | (2006.01) |
| ***B65D 85/38*** | (2006.01) |
| ***F41G 1/00*** | (2006.01) |
| ***F41G 1/04*** | (2006.01) |
| ***F41G 11/00*** | (2006.01) |
| ***G02B 23/16*** | (2006.01) |
| *F41G 1/38* | (2006.01) |

(52) U.S. Cl.

CPC ............... *G02B 23/16* (2013.01); *B65D 7/20* (2013.01); *B65D 77/26* (2013.01); *B65D 85/38* (2013.01); *F41G 11/003* (2013.01); *F41G 1/38* (2013.01)

(58) Field of Classification Search

CPC ........ B65D 77/20; B65D 77/26; B65D 85/38; B65D 25/10; F41G 1/065; F41G 1/038; F41G 11/003; F41G 1/383; F41G 1/04; G02B 23/16

USPC ......... 42/96, 129, 143; 206/316.1, 463, 780, 206/781, 775, 776, 777; 229/162.1–162.7; 362/110, 112; D22/108, 109, 110; D3/267, 294

See application file for complete search history.

(56) References Cited

U.S. PATENT DOCUMENTS 2,599,689 A 6/1952 Brelsford
2,722,310 A * 11/1955 Smith .................... B65D 5/326 229/152

(Continued)

*Primary Examiner* — Gideon R Weinerth
(74) *Attorney, Agent, or Firm* — Stinson LLP

(57) ABSTRACT

Packaging for a weapon sight and associated components and methods. The weapon sight may comprise a telescopic sight or scope and include a sighting axis along which a user looks to use the optical sighting device. The packaging comprises a package defining an interior sized and shaped to fit the sight. The packaging is configured to permit the user to view the optical sighting device through the cover and to look through the sight along the sighting axis.

31 Claims, 9 Drawing Sheets

(56) References Cited

U.S. PATENT DOCUMENTS

| | | | | | |
|---|---|---|---|---|---|
| 3,045,812 | A * | 7/1962 | Harry | A45D 27/22 | 206/349 |
| D209,050 | S * | 10/1967 | Saari | D3/263 | |
| 3,590,988 | A * | 7/1971 | Hollar | B65D 81/025 | 220/630 |
| 3,880,283 | A | 4/1975 | Flaherty et al. | | |
| D242,022 | S | 10/1976 | Bish | | |
| 3,986,659 | A | 10/1976 | Vajtay | | |
| 4,071,064 | A * | 1/1978 | Saul | B65D 15/22 | 220/324 |
| 4,394,797 | A * | 7/1983 | Schuster | F41G 1/04 | D22/108 |
| 4,552,264 | A * | 11/1985 | Quarrell | A47F 7/03 | 206/6.1 |
| 4,662,107 | A | 5/1987 | Van Den Kieboom | | |
| 4,700,883 | A * | 10/1987 | Vajtay | B65D 5/14 | 229/125.32 |
| D330,512 | S | 10/1992 | Ryberg | | |
| 5,183,953 | A * | 2/1993 | Anderson | F42B 39/00 | 42/129 |
| 5,289,916 | A * | 3/1994 | Mickelberg | B65D 5/4204 | 206/769 |
| 5,388,005 | A * | 2/1995 | Wilson | G02B 7/102 | 359/422 |
| D357,723 | S * | 4/1995 | Eddleman | D22/110 | |
| 5,566,490 | A * | 10/1996 | Owen | F41G 1/383 | 42/129 |
| 5,850,706 | A * | 12/1998 | Evans | G02B 27/0006 | 42/129 |
| D415,895 | S * | 11/1999 | McHale | D3/267 | |
| 6,016,919 | A | 1/2000 | Smith et al. | | |
| 6,047,833 | A | 4/2000 | Salomon | | |
| 6,208,461 | B1 | 3/2001 | Gaber | | |
| 6,463,697 | B2 | 10/2002 | Weder et al. | | |
| 6,474,471 | B1 * | 11/2002 | Miyake | B65D 75/32 | 206/316.2 |
| 6,622,867 | B2 * | 9/2003 | Menceles | B65D 43/021 | 206/771 |
| 6,681,512 | B2 | 1/2004 | Sammut | | |
| 6,817,471 | B2 * | 11/2004 | Harris | B65D 25/10 | 206/349 |
| D504,811 | S * | 5/2005 | Haingaertner | D9/415 | |
| 6,971,513 | B2 * | 12/2005 | Weinstein | B65D 11/02 | 206/321 |
| 7,000,775 | B2 * | 2/2006 | Gelardi | B65D 15/08 | 206/485 |
| D518,291 | S | 4/2006 | Zou et al. | | |
| D556,566 | S | 12/2007 | Steel, IV et al. | | |
| 7,374,048 | B2 * | 5/2008 | Mazurek | B65D 59/02 | 229/125.17 |
| D572,581 | S | 7/2008 | Steele, IV et al. | | |
| 7,581,671 | B2 | 9/2009 | Erdie | | |
| 7,681,755 | B2 | 3/2010 | Roesler | | |
| 8,181,379 | B2 * | 5/2012 | Brewer | F41G 1/383 | 42/129 |
| 8,240,547 | B2 * | 8/2012 | Stow, III | B65D 21/0202 | 229/162.6 |
| D681,444 | S | 5/2013 | Oja et al. | | |
| 8,607,986 | B2 | 12/2013 | Lipinski | | |
| 8,607,987 | B2 | 12/2013 | Oja et al. | | |
| D696,936 | S | 1/2014 | Radau et al. | | |
| 8,650,793 | B1 * | 2/2014 | Mendez | F41G 11/003 | 42/90 |
| 8,695,794 | B2 * | 4/2014 | Scatterday | A24F 15/01 | 206/242 |
| D704,549 | S | 5/2014 | Liu | | |
| D731,211 | S | 6/2015 | Denby et al. | | |
| 9,334,086 | B2 | 5/2016 | Bean | | |
| D765,213 | S * | 8/2016 | Seuk | D22/109 | |
| 9,759,527 | B2 * | 9/2017 | Davis | F41G 11/003 | |
| 9,846,009 | B1 | 12/2017 | McDaniels | | |
| 10,240,899 | B2 | 3/2019 | McDaniels | | |
| 10,345,077 | B1 | 7/2019 | Loebig et al. | | |
| 10,345,587 | B1 | 7/2019 | Loegig et al. | | |
| 11,565,850 | B1 * | 1/2023 | Lovell | B65D 55/02 | |
| 2006/0032765 | A1 | 2/2006 | Morhard et al. | | |
| 2006/0283733 | A1 | 12/2006 | Masa | | |
| 2007/0125672 | A1 | 6/2007 | Epling | | |
| 2007/0151900 | A1 * | 7/2007 | Altonen | B65D 25/10 | 206/776 |
| 2008/0296310 | A1 | 12/2008 | Steele, IV et al. | | |
| 2011/0049156 | A1 | 3/2011 | Long, Jr. | | |
| 2012/0285067 | A1 * | 11/2012 | Kitzen | F41G 11/003 | 42/90 |
| 2014/0197056 | A1 | 7/2014 | Schilling et al. | | |
| 2016/0069641 | A1 | 3/2016 | Kortemeier | | |
| 2018/0023921 | A1 | 1/2018 | Chavez | | |
| 2019/0105572 | A1 | 4/2019 | Bell | | |
| 2021/0092864 | A1 * | 3/2021 | Cha | H05K 7/183 | |
| 2021/0164610 | A1 * | 6/2021 | Roth | H05K 5/0221 | |
| 2021/0356233 | A1 * | 11/2021 | Holbrook | A45C 13/02 | |
| 2022/0340348 | A1 * | 10/2022 | Ball | G02B 23/16 | |
| 2023/0144006 | A1 * | 5/2023 | Payne | B65D 77/26 | 206/316.1 |

* cited by examiner

WEAPON SIGHT PACKAGING

CROSS-REFERENCE TO RELATED APPLICATION

The present application claims priority to U.S. Provisional Patent App. No. 63/263,685, filed Nov. 7, 2021, which is hereby incorporated by reference in its entirety.

FIELD

The present disclosure generally relates to product packaging, and more particularly to product packaging for a telescopic sight.

BACKGROUND

Optical sighting devices, such as telescopic sights (or "scopes") are used on various types of firearms. Such products may be packaged for sale to consumers. A retail store commonly includes a counter storing samples of unpackaged products for consumers to inspect with the assistance of a store employee behind the counter. For example, a consumer may ask the employee to retrieve a certain product sample from the counter and permit the consumer to hold and test the product. When the user is finished, the product is returned to the counter by the employee. If the consumer decides to buy the product, the employee may give the consumer a packaged version of the product to carry to the store checkout counter.

SUMMARY

In one aspect, packaging is for a telescopic sight having a sighting axis along which a user looks to use the telescopic sight. The packaging comprises a package defining an interior sized and shaped to fit the telescopic sight. The package includes a base comprising a telescopic sight mount to which the telescopic sight is connected. The package comprises a cover connected to the base and at least partially bounding the interior. The cover is configured to permit the user to view the telescopic sight through the cover and to look through the telescopic sight along the sighting axis.

In another aspect, a telescopic sight assembly comprises a telescopic sight having a sighting axis along which a user looks to use the telescopic sight. A package at least partially houses the telescopic sight. The package comprises a non-opaque forward portion and a non-opaque rear portion. The telescopic sight is located in the packaging to permit viewing through the telescopic sight along the sighting axis through the forward and rear end portions.

Other objects and features of the present disclosure will be in part apparent and in part pointed out herein.

BRIEF DESCRIPTION OF THE DRAWINGS

Corresponding reference numbers indicate corresponding parts throughout the drawings.

DETAILED DESCRIPTION

Figure 1:
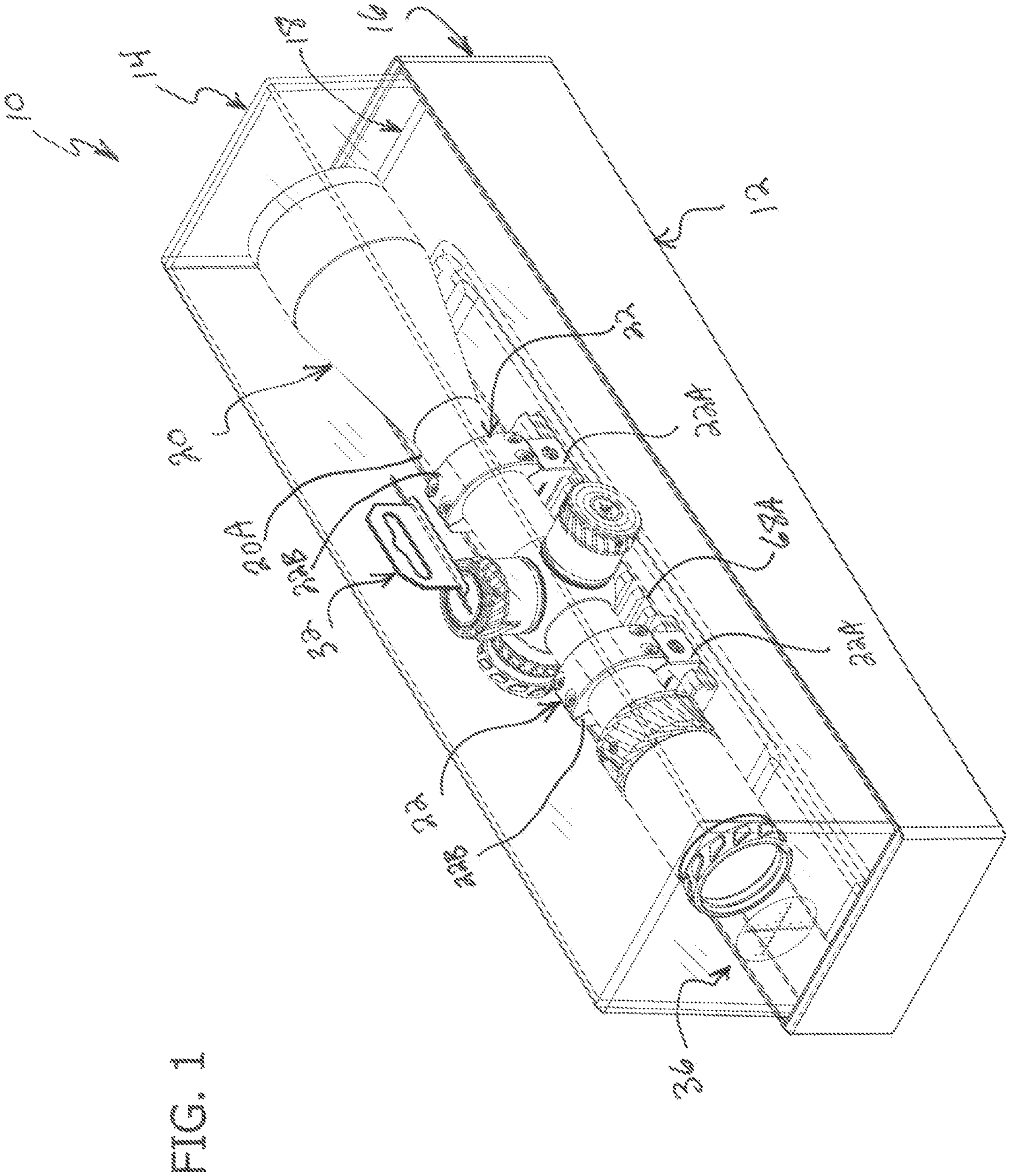
FIG. 1 is a perspective of optical sight packaging of the present disclosure.

Referring to FIGS. 1-7, an optical sighting device packaging of the present disclosure is indicated generally by 10 for an optical sighting device 20. The optical sighting device can be referred to as a telescopic sight, also commonly known as a "scope," for a firearm or other weapon such as a crossbow. The sight is shown inside retail packaging (broadly, "product packaging"). The sight includes a tubular body 20A having a front end (into which the user looks to aim the weapon) and a rear end (out of which the user looks). The sight includes one or more lenses 20B (broadly, optical system) inside and supported by the body 20A. The one or more lenses 20B may magnify objects in the user's field of view through the site 20 (e.g., based on a refracting telescope configuration). The sight 20 also includes a reticle viewable in the user's field of view to aid a user in sighting a target. Other types of sights (e.g., tubular sights without a magnifying lens, and/or without a reticle, etc.) can be used without departing form the scope of the present disclosure.

In the illustrated embodiment, the retail packaging 10 for the sight comprises a base 12, a cover 14, an optional hanger 32, and an optional imitation reticle indicator 36 (broadly, reticle imitation graphic). The base 12 defines a mount/bed 60 for connecting to the sight. The cover 14 is configured to connect to the base 12 to enclose the sight 10 but still permit viewing of the sight through the cover; and to permit viewing down a sight axis SA of the sight through the cover. It is understood that the sight has an optical sighting axis SA intended for the user to look down to use the sight.

In the illustrated embodiment, the base 12 comprises a housing 16 and an insert 18. The housing 16 receives the insert 18, and the insert 18 defines the mount/bed 60. Other configurations (e.g. unitary base) can be used without departing from the scope of this disclosure.

Figure 3:
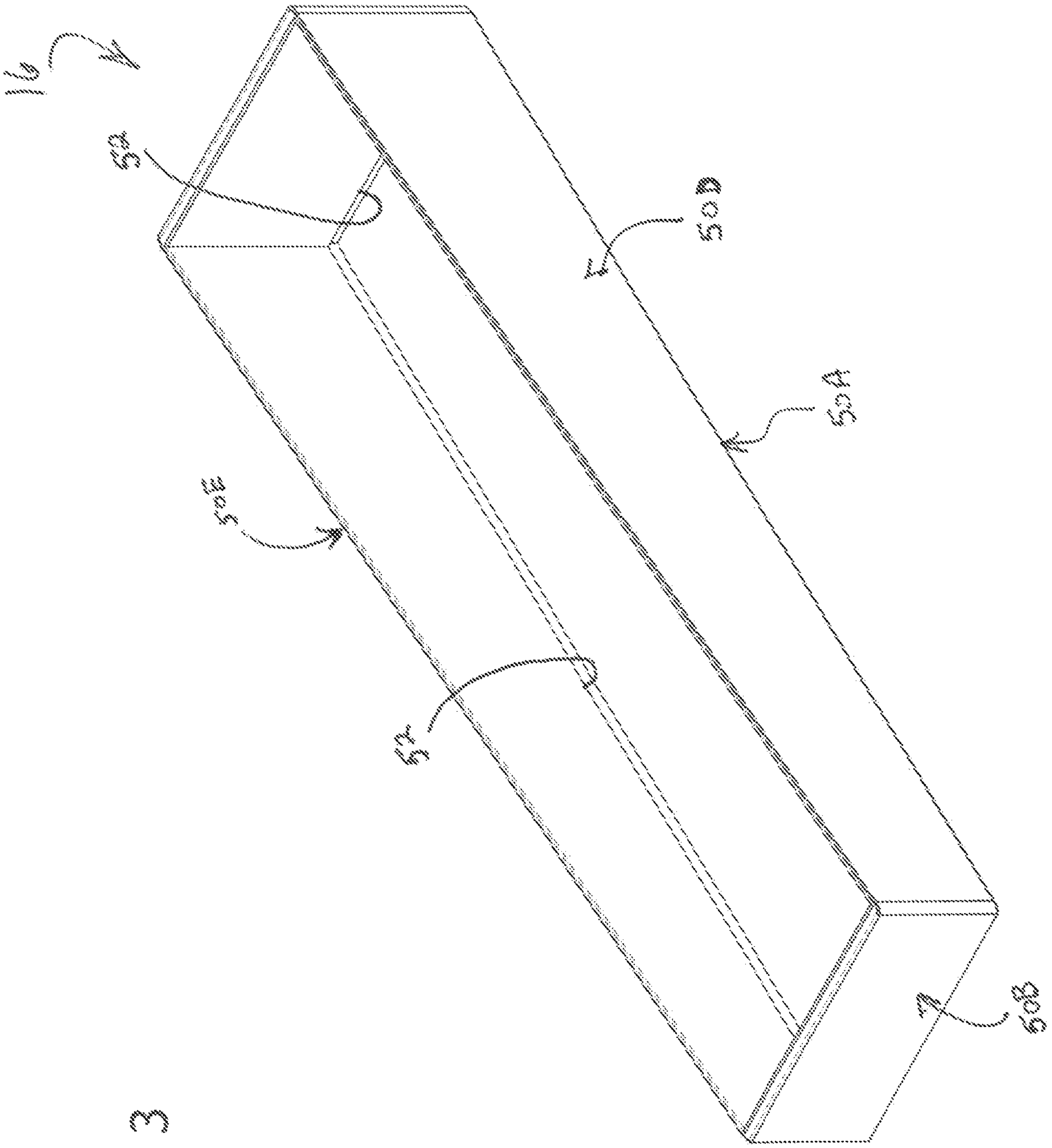
FIG. 3 is a perspective of a housing of the optical sight packaging.

Referring now to FIG. 3, the housing 16 includes a bottom wall 50A, a forward wall 50B, a rear wall 50C, a left wall 50D and a right wall 50E. Together the walls form an interior. The interior is sized and shaped for receiving the insert 18. The housing 16 includes housing connectors 52. In the illustrated embodiment, the housing connectors 52 comprise retaining lips. The function of the housing connectors will be explained in further detail below.

Figure 2:
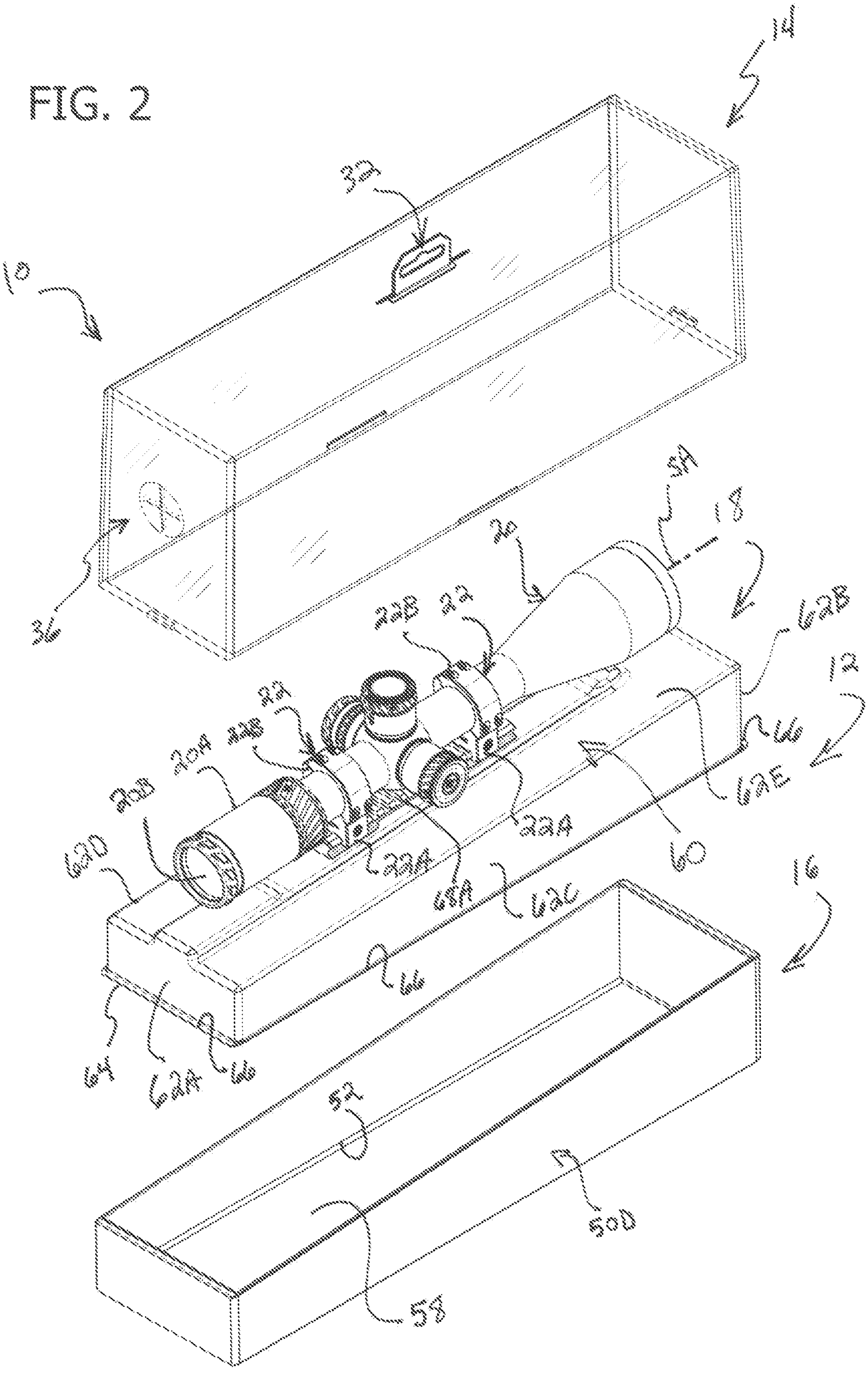
FIG. 2 is an exploded perspective of the optical sight packaging.

Referring now to FIG. 2, the insert 18 includes a forward wall 62A, a rear wall 62B, a left wall 62C, a right wall 62D, and an upper portion 62E. The upper portion 62E defines the mount/bed 60. The insert 18 further comprises a peripheral flange 64 defining an upwardly facing shoulder 66 for reasons explained below. The upper portion 62E defines firearm imitation structure 68 intended to imitate a portion of a firearm on which the sight is intended to be mounted. In the illustrated embodiment, the firearm imitation structure comprises imitation structure representing a dovetail-type rail 68A of a firearm, such as a rail on a rifle. Optionally, connectors 22 (e.g., scope rings) can be used to connect the sight to the firearm imitation structure (mount/bed). Examples of such connectors are described in further detail below. Other types of connectors can be used, and the connectors can be omitted, without departing from the scope of the present disclosure.

Figure 6:
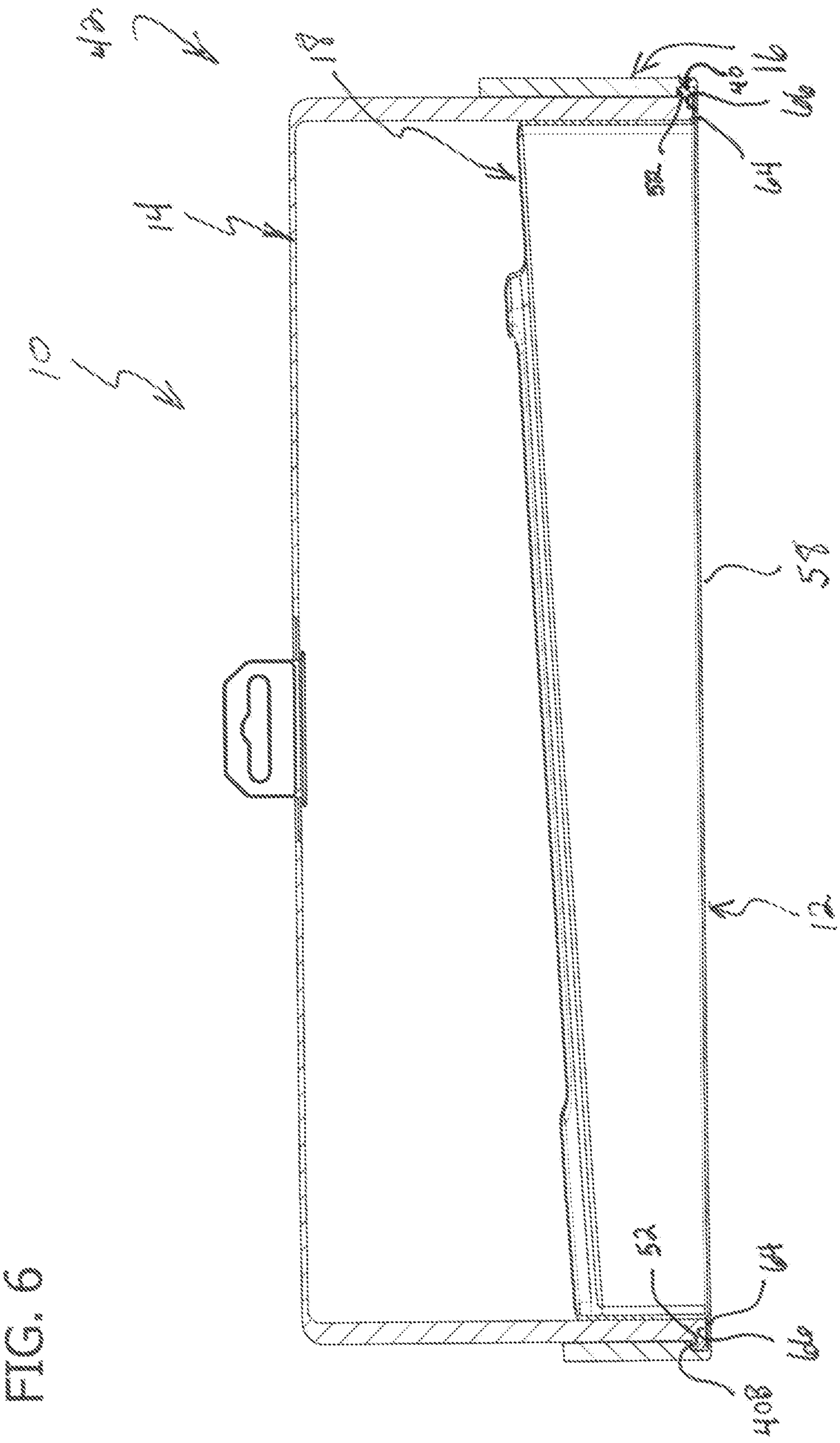
FIG. 6 is a cross-section of the optical sight packaging.

Now referring to FIGS. 4 and 6, the cover 14 will be described in further detail. In the illustrated embodiment, the cover 14 is made from a transparent material (broadly, "non-opaque" material) for reasons that will be explained below. The cover 14 can be made of plastic (e.g. acrylic) or another suitable material. The cover 14 includes a cover body 30 comprising a forward wall 38A, a rear wall 38B, a left wall 38C, a right wall 38D, and an upper portion 38E. The forward wall 38A is spaced forward from the lens of the optical sighting device. In the illustrated embodiment, the cover includes the hanger 32 and the hanger 32 is connected to the cover body. The hanger comprises a plastic hanger 32A defining a hanger opening through which a display rack could extend for displaying the packaging hanging from the rack. It will be understood other types of hangers could be used (e.g. a cord), and the hanger could be omitted, without departing from the scope of the present disclosure.

Figure 4:
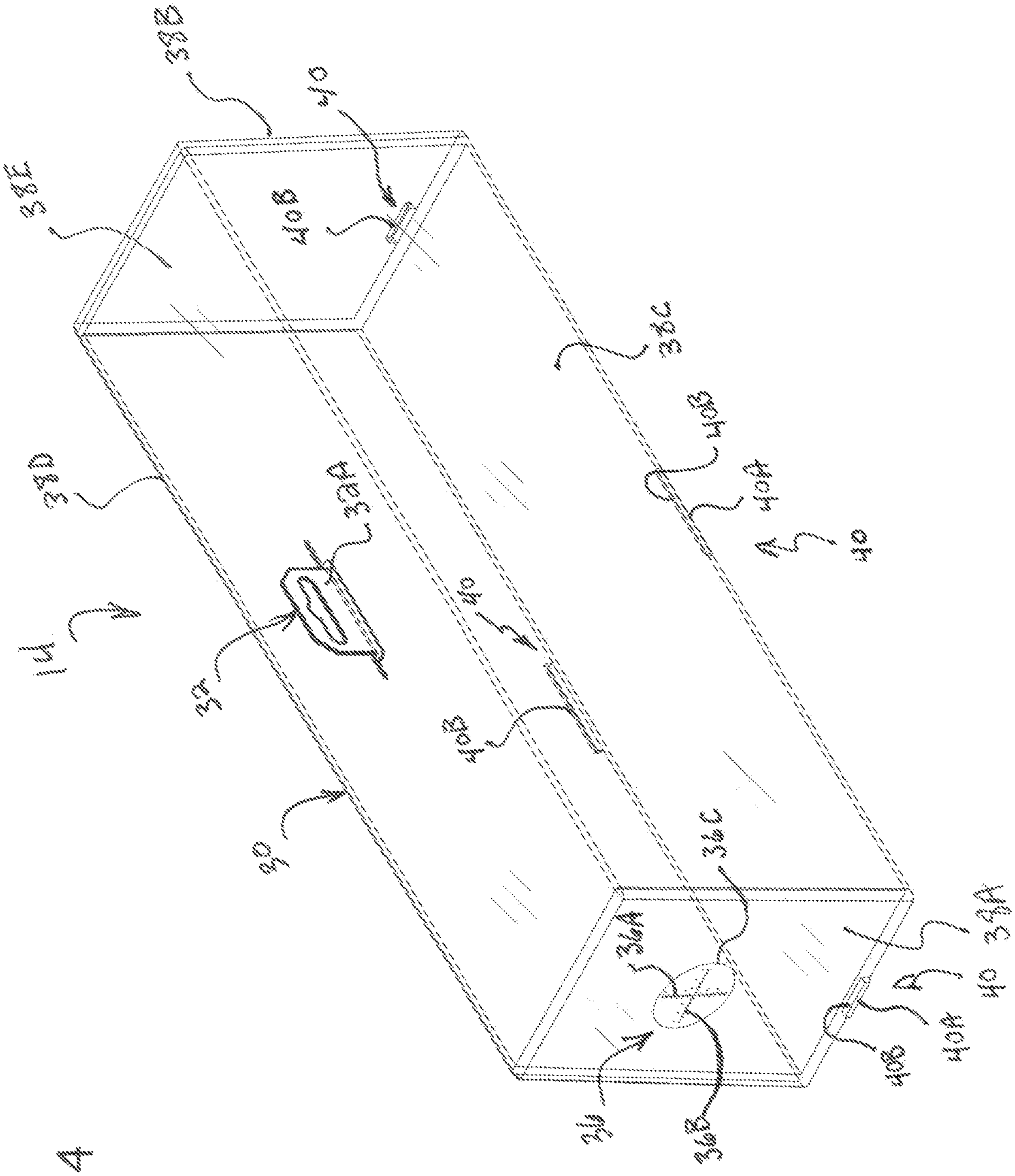
FIG. 4 is a perspective of a cover of the optical sight packaging.

As shown in FIG. 4, the cover 14 includes cover connectors 40. The cover connectors are connected to the cover body and serve to connect the cover to the base. In the illustrated embodiment, the cover connectors comprise lugs 40A that protrude laterally outward from the cover body. The lugs include upwardly facing retaining surfaces 40B that interact with the base to secure the cover to the base. Other configurations of cover connectors can be used, or the cover connectors can be omitted, without departing from the scope of the present disclosure.

It will be appreciated that the housing 16 and cover 14 can be referred to collectively as an enclosure 42 in which the optical sighting device 20 and insert 18 are received.

The cover connectors 40 connect to the housing connectors 52 to connect the cover to the housing. The cover connectors 40 are located on the cover body to be in registration with respective connectors 52 of the housing. The cover connectors 40 and housing connectors 52 are arranged to engage each other when the cover is installed into the housing. The arrangement is such that the connections of the lugs 40A and the housing connectors 52 are formed automatically when the cover 14 is installed in the housing 16. In the illustrated embodiment, the connection is not releasable (semi-permanent) but can be disconnected by intentionally damaging the package to remove the sight from the packaging after purchase. The upwardly facing retaining surfaces 40B of the cover connectors oppose the retaining lips 52 of the housing to obstruct upward movement of the cover relative to the housing. Absent tearing the housing to disconnect the cover from the housing (or some other destruction of the packaging), desirably the cover is not readily removable from the housing such that the connections are semi-permanent. It will be understood that other configurations of connectors (e.g., releasable connectors) and/or connections can be used without departing from the scope of this disclosure. For example, adhesive, tape, etc. could be used in addition to or instead of the cover and housing connectors.

In the illustrated embodiment, a bottom portion of the cover 14 engages the shoulder 66 of the insert 18 to locate the insert in the housing 16. The engagement of the cover and insert holds the insert in the housing.

The packaging 10 permits a consumer to view the reticle (broadly, sighting graphic and/or display graphic) of the sight and experience the field of view of the sight. When the sight is in the packaging 10, the packaging permits the consumer to view the reticle and field of view by looking through the sight. The person/purchaser simply holds the packaged sight to their line of sight and looks through the rear wall and down the sighting axis SA to see the reticle of the sight.

Optionally, the user can also reference the imitation reticle indicator 36, which may be located on the packaging to be in line with the sighting axis SA. In the view of FIG. 4, the packaging 10 is shown as including the imitation reticle indicator 36. In the illustrated embodiment, the indicator 36 is provided on the forward wall 38A of the cover so the indicator is intersected by the sighting axis SA. In the illustrated embodiment, the reticle indicia 36 includes cross hairs reticle indicia including a vertical primary cross hair 36A and a horizontal primary cross hair 36B. Shorter secondary horizontal cross hairs cross the vertical primary cross hair, and shorter secondary vertical cross hairs cross the horizontal primary cross hair. The reticle 36 can include reference indicators (e.g., numbers) at various locations (e.g., for assisting in adjusting aim for various windage and elevation circumstances). A circle 36C is provided around the reticle indicia to estimate the view through the scope.

The imitation reticle indicator 36 is shown as printed on the housing, but it will be appreciated the indicator 36 could be provided in other ways, such as on a sticker applied to the housing. Such a sticker could be made from a transparent material (e.g. clear tape) to provide a clear view for the user when looking down the sighting axis SA of the sight. The imitation reticle indicator 36 is representative of the reticle of the sight in the packaging. Desirably, one or more of the size, shape, pattern, color, etc. of the imitation reticle indicator 36 is the same as the size, shape, pattern, color of the reticle of the sight, when the sight is outside of the enclosure, turned on, and in use. More desirably, the imitation reticle indicator 36 is approximately to scale (e.g. +/−20%; +/−15%; +/−10%) of the size of the reticle of the sight. It will be understood that the imitation reticle indicator may change in accordance with the sighting graphic provided by the sight housed in the packaging. Moreover, the imitation reticle indicator may be omitted (e.g., if the actual reticle is visible, or if the sight does not include a reticle).

In the illustrated embodiment, the bottom wall 50A of the housing includes a removable portion (panel) 58. For example, the removable portion could be breakable away from the remainder of the bottom wall 50A (e.g., frangible connection, perforation, scoring, etc.). When the removable portion 58 is removed, the bottom wall 50A defines an opening which provides an access point for the person to continue to remove the bottom wall, and thus the insert from the housing. In another embodiment, the bottom wall 50A may define an opening sized and shaped for the person to insert a finger to begin disassembling the packaging. Other configurations of providing an access point to begin opening the package (e.g. pull-tab) are not outside the scope of this disclosure.

Figure 5:
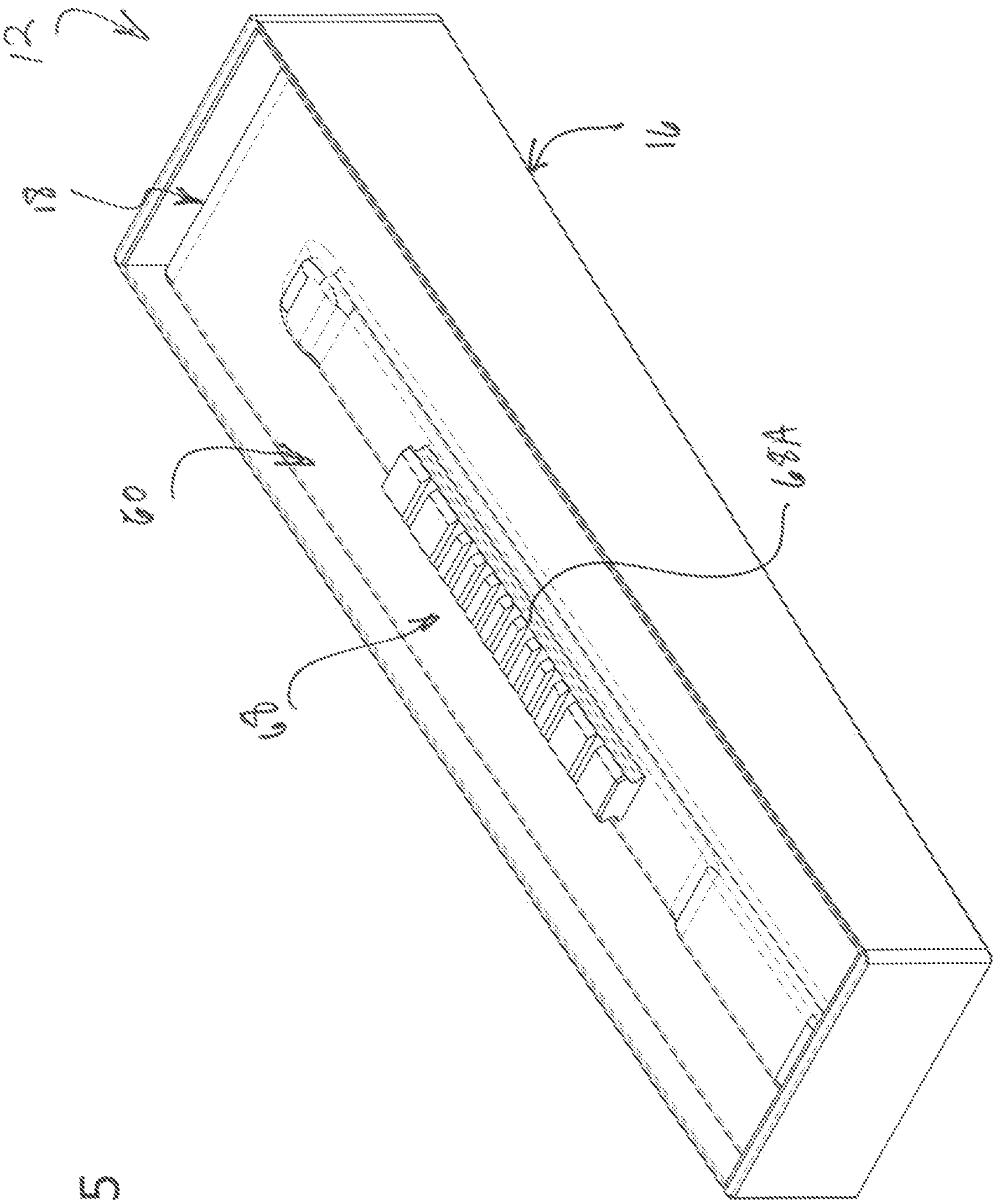
FIG. 5 is a perspective of an insert in the housing of the optical sight packaging.

Referring to FIGS. 1 and 5, the mount is sized and shaped to imitate firearm structure, as described above. With reference to FIG. 5, the mount includes a dovetail-style rail 68A (e.g., integrally formed with the body of the insert) imitating a rail of a firearm. As shown in FIG. 2, the connectors 22 each comprise a pair of jaws 22A for securing the connectors to the rail, and each include a ring 22B for securing the sight 10 to the connector 22. The jaws 22A are clamped on the rail 68A (e.g., by tightening screws), and the rings 22B are tightened on the sight 10 (e.g., by tightening screws). It will be appreciated the connectors 22 can be made of metal and intended for installation on a firearm, or can be made of plastic or other disposable material and intended for temporary use with the packaging. Other types of connectors can be used without departing form the scope of the present disclosure. For example, zip ties, cinch cords, or zip ties, (broadly, ties) can be used to secure the sight to the insert (e.g., through one or more openings in the insert). In such a configuration, the insert might not include imitation firearm structure and yet include a bed or cradle configured to stabilize and securely hold the sight in conjunction with the fastener(s). Other types of connectors can be used, other numbers of connectors can be used, and the connectors can be omitted without departing from the scope of the present disclosure.

Figure 7:
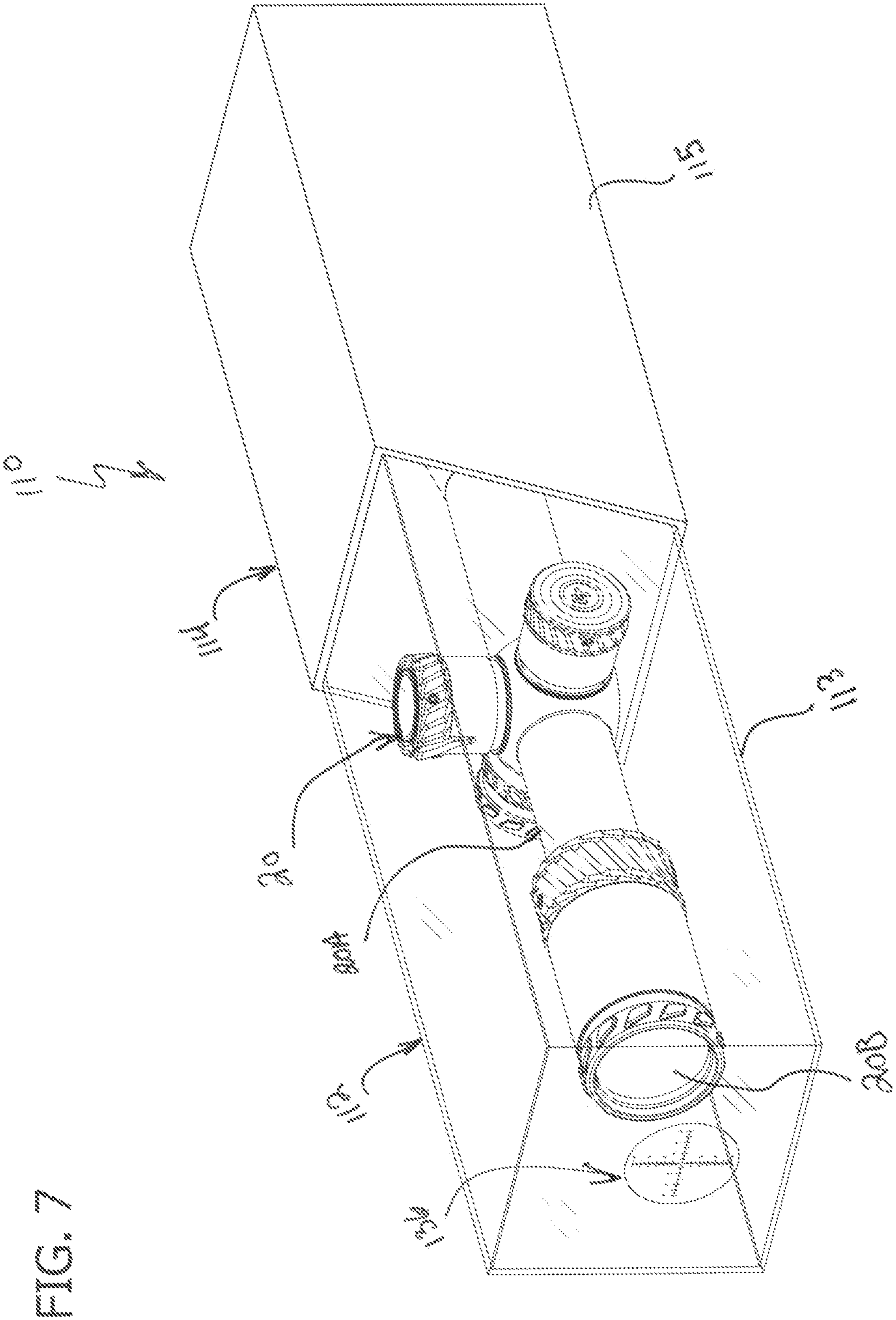
FIG. 7 is a front perspective of a second embodiment of optical sight packaging of the present disclosure.
Figure 8:
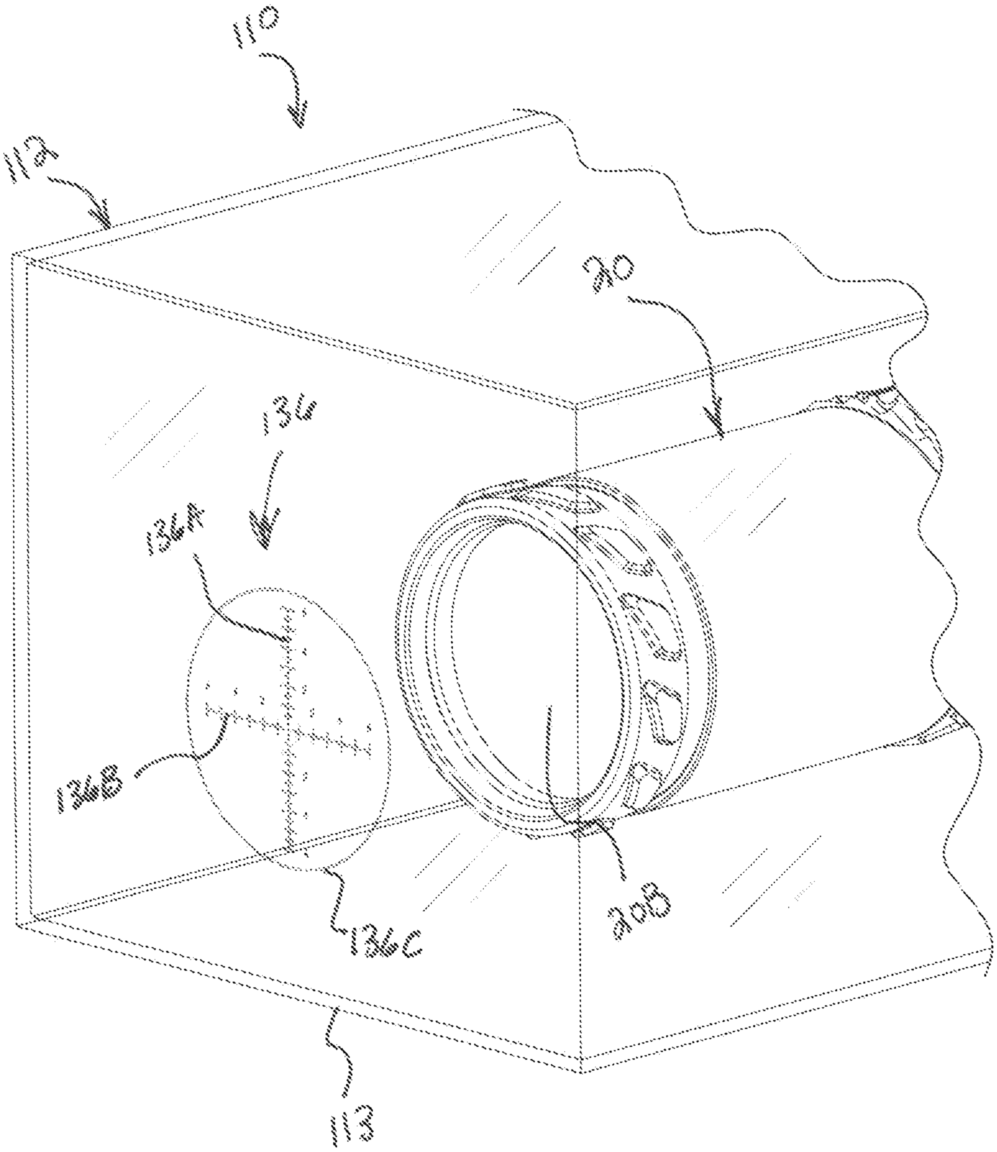
FIG. 8 is an enlarged fragmentary front perspective of the optical sight packaging of FIG. 7.
Figure 9:
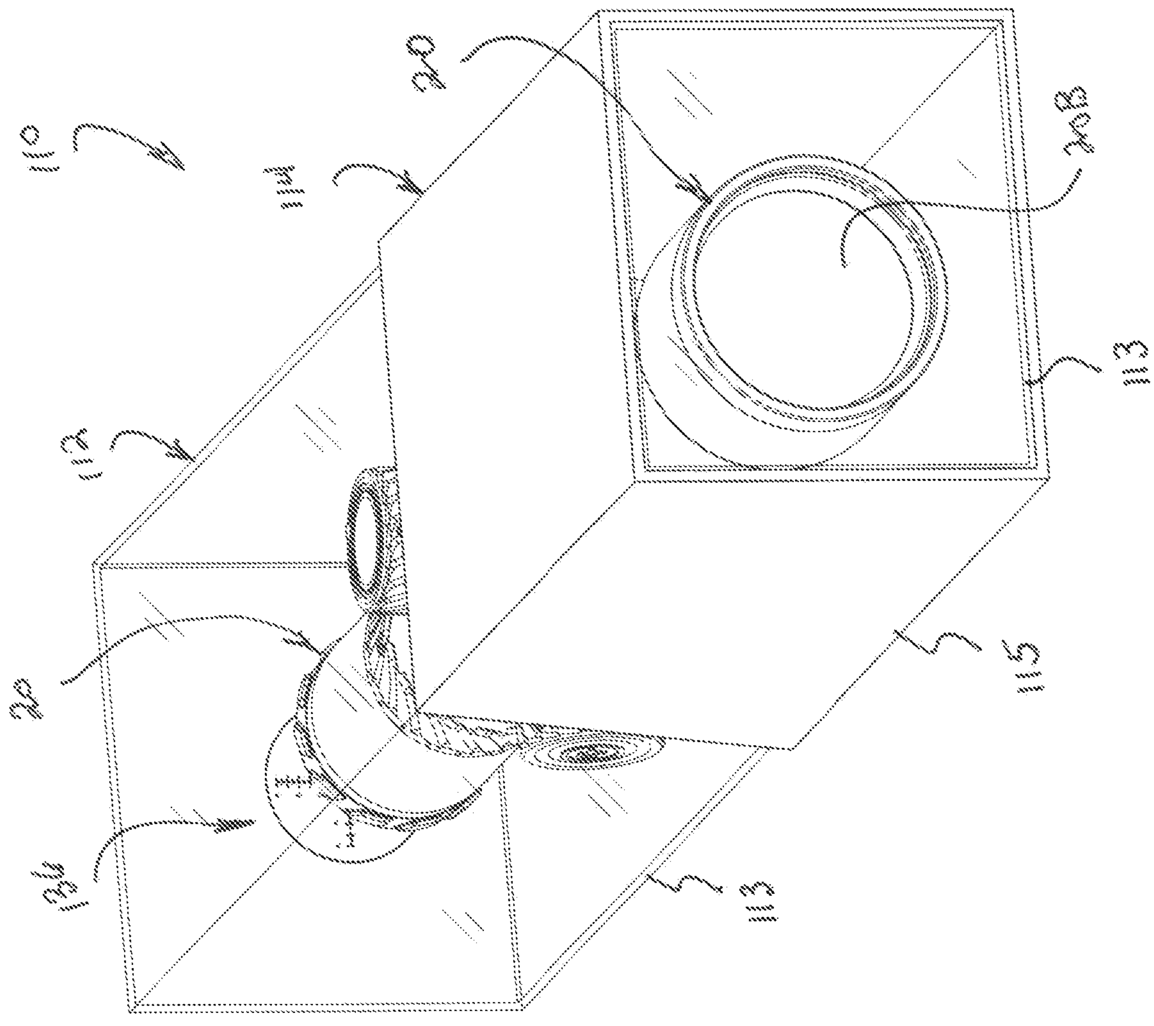
FIG. 9 is a rear perspective of the optical sight packaging.

Referring to FIGS. 7 and 8, a second embodiment of the present disclosure is generally indicated by 110. In this embodiment, the packaging 110 includes a housing 112 (broadly, first packaging component) and a cover 114 (broadly, second packaging component). The housing 112 comprises a box 113 of transparent material (broadly, non-opaque material), having six sides (front, rear, left, right, top, and bottom). The box 113 is generally elongate and defines an interior sized to hold the sight 20 therein. The front end of the sight 20 is located adjacent the front end of the box 113, and the rear end of the sight is located adjacent the rear end of the box. Likewise, the top of the sight 20 is oriented to be adjacent the top of the box 113, and the bottom of the sight is oriented to be adjacent the bottom of the box, etc. The box 113 can include a door (e.g., rear end panel) configured to permit opening and closing of the box. For example, the rear end panel of the box can be hinged to the remainder of the box and movable to open/close the box for insertion and removal of the sight. The box 113 can have opaque segments (e.g., printed logo, indicia, text, etc.), but generally the box is made of transparent or translucent material to permit viewing the sight therethrough. Other configurations can be used without departing from the scope of the present disclosure.

The cover 114 comprises a sleeve 115 formed of opaque material. For example, the cover 114 could comprise paper, cardboard, plastic, etc. The cover 114 overlies the housing 112. The cover 114 defines an interior in which a portion of the housing 112 is received and in which a portion of the sight 20 is received. In the illustrated embodiment, the cover 114 includes top, bottom, left, and right walls extending around the housing 112. The cover 114 has open front and rear ends such that the housing 112 can extend forward out of the cover, and the rear wall of the housing is exposed at the open rear end of the cover. The arrangement is such that the customer can see through the housing 112 from the front end to the rear end, and out the rear end. This permits the customer to look through the sight 20 to simulate using the sight, without having to remove the sight from the packaging 110. This assists the customer in determining whether to purchase the sight, without needing store personnel to open the packaging or provide a different unpackaged sample for the user to see. Other configurations can be used without departing from the scope of the present disclosure.

Alternatively, one or more ends of the housing can be opaque, covered (e.g., covered by a wall of the second packaging component), etc. to prevent viewing through the scope to daylight.

The cover 114 provides visual contrast relative to the housing and provides additional area for logos, indicia, text, etc. The cover also can provide a color contrast relative to the first packaging component. For example, the cover 114 can be formed of or have printed thereon a color such as red, green, black, and/or blue. In assembly, the cover 114 is installed over the housing 112, before or after the sight 20 is installed in the housing. The cover 114 can be held in position by friction fit with the housing 112 or by tape, adhesive, etc. Securing the cover to the housing may serve a secondary function of locking the door of the housing (e.g., by overlapping and/or being adhered to the door) and requiring destruction of the cover and/or housing to access the sight therein (e.g., after purchase by a consumer).

In this embodiment, the sight 20 is not mounted to the packaging 110 but may have a relatively tight fit in the packaging to prevent movement of the sight in the packaging. Alternatively, an insert having a mount can be provided for securing the sight (e.g., using suitable connectors). Other configurations can be used without departing from the scope of the present disclosure.

As explained above, in the illustrated embodiment, the weapon sight 20 has a cross hairs reticle. In this embodiment of the packaging 110, indicia representing the reticle 136 is provided (e.g., printed) on the housing 112 adjacent its front end to be adjacent and in register with the front end of the sight (through which the user looks). The reticle indicia 136 on the packaging can simulate the actual reticle of the sight. For example, the reticle indicia 136 may be provided in scale to represent the view of the reticle the user would have when looking through the sight. As with the first embodiment, the cross hairs reticle indicia 136 includes a vertical primary cross hair 136A and a horizontal primary cross hair 136B. Shorter secondary horizontal cross hairs cross the vertical primary cross hair, and shorter secondary vertical cross hairs cross the horizontal primary cross hair. The reticle 136 can include reference indicators (e.g., numbers) at various locations (e.g., for assisting in adjusting aim for various windage and elevation circumstances). A circle 136C is provided around the reticle indicia to estimate the view through the scope. Sights with other types of reticles can be housed in the packaging, and such reticles can be shown/represented on the packaging, without departing from the scope of the present disclosure.

It will be apparent that modifications and variations are possible without departing from the scope of the invention defined in the appended claims. The dimensions and proportions described herein are by way of example without limitation. Other dimensions and proportions can be used without departing from the scope of the present disclosure.

As various changes could be made in the above constructions and methods without departing from the scope of the invention, it is intended that all matter contained in the above description and shown in the accompanying drawings shall be interpreted as illustrative and not in a limiting sense.

What is claimed is:

1. Packaging for an optical sighting device, the optical sighting device having a sighting axis along which a user looks to use the optical sighting device, the packaging comprising:

- a package defining an interior sized and shaped to fit the optical sighting device, the package including:
  - a base comprising an optical sighting device mount configured to connect to and support the optical sighting device, the optical sighting device mount comprising a bed configured to support the optical sighting device when the optical sighting device is connected to the optical sighting device mount, the bed comprising imitation firearm structure configured to imitate a portion of a firearm; and
  - a cover connected to the base and at least partially bounding the interior, the cover being configured to permit the user to view the optical sighting device through the cover and to look through the optical sighting device along the sighting axis.

2. The packaging of claim 1, wherein the cover comprises a forward portion bounding a forward part of the interior and a rear portion bounding a rear part of the interior, the forward and rear portions being configured to permit the user to look through the forward and rear portions to look through the cover and through the optical sighting device along the sighting axis.

3. The packaging of claim 2, wherein the forward and rear portions of the cover are transparent.

4. The packaging of claim 3, wherein the cover includes a forward wall and a rear wall, the forward wall including the forward portion, the rear wall including the rear portion, the forward wall being transparent, and the rear wall being transparent.

5. The packaging of claim 1, wherein the imitation firearm structure comprises an imitation firearm rail.

6. The packaging of claim 1, wherein the imitation firearm structure comprises a dovetail rail.

7. The packaging of claim 1, wherein the package includes a package body and the optical sighting device mount is formed separately from and connected to package body.

8. The packaging of claim 7, wherein the imitation firearm structure comprises a dovetail rail.

9. The packaging of claim 1, wherein the cover and base are configured to automatically form a semi-permanent connection of the cover and base when the cover is connected to the base.

10. The packaging of claim 1, wherein the cover includes a cover connector and the base includes a base connector, the cover connector and base connector being connectable to each other to form a retaining connection configured to retain the cover on the base.

11. The packaging of claim 10, wherein at least one of the cover connector or the base connector comprises a lug, and the other of the at least one of the cover connector or the base connector comprises a lip, the lug being configured to engage the lip to resist disconnection of the cover from the base.

12. The packaging of claim 11, wherein the lug and lip are configured to automatically form the retaining connection when the cover is installed on the base.

13. The packaging of claim 12, wherein the lug comprises a retaining surface opposing the lip.

14. The packaging of claim 1, wherein the base comprises a housing and an insert, the insert sized and shaped to fit in the housing, the insert including the optical sighting device mount, the cover configured to capture the insert when the cover is connected to the base to locate the insert in the housing.

15. The packaging of claim 1, wherein the base comprises a housing and an insert formed separately from the housing, the insert comprising the optical sighting device mount.

16. The packaging of claim 15, wherein the insert comprises a shoulder configured to engage the cover to locate the insert relative to the housing.

17. The packaging of claim 1, in combination with the optical sighting device, the optical sighting device including at least one lens and a reticle, the optical sighting device being connected to and supported by the optical sighting device mount of the base.

18. The packaging of claim 1, in combination with the optical sighting device, the optical sighting device comprising a firearm scope having a reticle, the optical sighting device being connected to and supported by the optical sighting device mount of the base.

19. A optical sighting device assembly comprising:
- an optical sighting device having a sighting axis along which a user looks to use the optical sighting device;
- a package at least partially housing the optical sighting device, the package comprising a non-opaque forward portion and a non-opaque rear portion, the non-opaque forward and rear portions being formed of translucent or transparent material, the optical sighting device being located in the packaging to permit viewing through the optical sighting device along the sighting axis through the translucent or transparent material of the forward and rear end portions.

20. The optical sighting device assembly of claim 19, wherein the housing comprises a box made of non-opaque material.

21. The optical sighting device assembly of claim 19, wherein the package comprises an opaque sleeve, the opaque sleeve defining an interior in which the housing and the optical sighting device are received in.

22. The optical sighting device assembly of claim 21, wherein the interior of the sleeve has opposite open front and rear ends configured to permit the viewing through the telescope sight along the sighting axis.

23. The optical sighting device assembly of claim 21, wherein the housing has a length parallel to the sighting axis and the sleeve extends over a portion of the length of the housing.

24. Packaging for an optical sighting device, the optical sighting device having a sighting axis along which a user looks to use the optical sighting device, the packaging comprising:
- a package defining an interior sized and shaped to fit the optical sighting device, the package including:
  - a base comprising an optical sighting device mount configured to connect to and support the optical sighting device, the optical sighting device mount comprising a dovetail rail; and
  - a cover connected to the base and at least partially bounding the interior, the cover being configured to permit the user to view the optical sighting device through the cover and to look through the optical sighting device along the sighting axis.

25. The packaging of claim 24, wherein the cover comprises a forward portion bounding a forward part of the interior and a rear portion bounding a rear part of the interior, the forward and rear portions being configured to permit the user to look through the forward and rear portions to look through the cover and through the optical sighting device along the sighting axis.

26. The packaging of claim 25, wherein the cover includes a forward wall and a rear wall, the forward wall including the forward portion, the rear wall including the rear portion, the forward wall being transparent, and the rear wall being transparent.

27. The packaging of claim 24, wherein the package includes a package body and the optical sighting device mount is formed separately from and connected to package body.

28. The packaging of claim 24, wherein the cover is connected to the base in a manner that forms a semi-permanent connection between the cover and base requiring damaging of the packaging to disconnect the cover from the base.

29. The packaging of claim 24, wherein the cover includes a cover connector and the base includes a base connector, the cover connector and base connector being connectable to each other to form a retaining connection configured to retain the cover on the base.

30. The packaging of claim 24, wherein the base comprises a housing and an insert, the insert sized and shaped to fit in the housing, the insert including the optical sighting device mount, the cover configured to capture the insert when the cover is connected to the base to locate the insert in the housing.

31. The packaging of claim 24, in combination with the optical sighting device, the optical sighting device being connected to and supported by the dovetail rail.

* * * * *